(12) United States Patent
Tomizawa et al.

(10) Patent No.: US 8,509,048 B2
(45) Date of Patent: Aug. 13, 2013

(54) STORAGE DEVICE

(75) Inventors: Yasushi Tomizawa, Tokyo (JP); Akihiro Koga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/422,882

(22) Filed: Mar. 16, 2012

(65) Prior Publication Data
US 2013/0064062 A1      Mar. 14, 2013

(30) Foreign Application Priority Data

Sep. 14, 2011  (JP) ................................. P2011-201222

(51) Int. Cl.
*G11B 9/00* (2006.01)
(52) U.S. Cl.
USPC ........................................................ 369/126
(58) Field of Classification Search
USPC ........................................................ 369/126
See application file for complete search history.

(56) References Cited

U.S. PATENT DOCUMENTS

| | | | |
|---|---|---|---|
| 7,483,362 B2* | 1/2009 | Ishii et al. ..................... | 369/126 |
| 7,514,942 B2* | 4/2009 | Rao ........................... | 324/756.04 |
| 7,945,962 B2* | 5/2011 | Maeda et al. .................... | 850/1 |

FOREIGN PATENT DOCUMENTS

| | | |
|---|---|---|
| JP | 2007-48330 | 2/2007 |
| JP | 4145773 | 6/2008 |

* cited by examiner

*Primary Examiner* — Wayne Young
*Assistant Examiner* — Brenda Bernardi
(74) *Attorney, Agent, or Firm* — Finnegan, Henderson, Farabow, Garrett & Dunner, L.L.P.

(57) ABSTRACT

A storage device includes a storage medium and a plurality of probes. The probes each have a recording/reproducing portion. The probes include a first probe, a second probe spaced from the first probe in a first direction, and a third probe spaced from the first probe in the first direction and in a second direction different from the first direction. A distance $X_{p1}$ in the first direction between the portions of the first and second probes, a distance $X_{p2}$ in the first direction between the portions of the first and third probes, and a distance $Y_{p2}$ in the second direction between the portions of the first and third probes satisfy the following formulae:

$$X_{p1} = n \times X_m$$

$$X_{p1} = X_m$$

$$Y_{p2} = Y_m/n \qquad \text{[Math 1]}$$

(, provided that n=2, 3, 4, - - - ),
where
$X_m$ and $Y_m$ are lengths of each area in the first and second directions, respectively.

3 Claims, 7 Drawing Sheets

STORAGE DEVICE

CROSS REFERENCE TO RELATED APPLICATION

This application is based upon and claims the benefit of priority from the prior Japanese Patent Application No. 2011-201222, filed on Sep. 14, 2011, the entire contents of which are incorporated herein by reference.

FIELD

Embodiments relate basically to a storage device.

BACKGROUND

In a storage device that uses a plurality of probes to record/reproduce data, the respective probes are assigned to areas on a storage medium for recording/reproduction of data. The arrangement relationship between the areas and the probes may cause a dead space where data cannot be recorded or reproduced. Such a dead space prevents density growth of data and thus is undesirable.

In this regard, the size of each area may be increased to avoid the formation of the above-mentioned dead space. In this case, however, the probes cannot be arranged with a high density, and thus, even simultaneous recording/reproducing of data with a plurality of probes does not enable rapid recording/reproducing.

BRIEF DESCRIPTION OF THE DRAWINGS

Aspects of this disclosure will become apparent upon reading the following detailed description and upon reference to the accompanying drawings.

DESCRIPTION

As will be described below, in accordance with an embodiment, a storage device includes a storage medium and a plurality of probes. The storage medium includes a plurality of areas and is configured to store a signal in each of the areas. Each of the probes has a recording/reproducing portion facing the storage medium and is configured to record/reproduce a signal to/from each of the areas via the portion. In addition, the probes include a first probe, a second probe spaced from the first probe in a first direction, and a third probe spaced from the first probe in the first direction and in a second direction different from the first direction. Furthermore, a distance $X_{p1}$ in the first direction between the portions of the first probe and the second probe, a distance $X_{p2}$ in the first direction between the portions of the first probe and the third probe, and a distance $Y_{p2}$ in the second direction between the portions of the first probe and the third probe satisfy the following formulae:

$$X_{p1}=n \cdot X_m$$
$$X_{p2}=X_m$$
$$Y_{p2}=Y_m/n \quad \text{[Math 1]}$$

(, provided that n=2, 3, 4, ...),
where
$X_m$ is a length of each area in the first direction; and
$Y_m$ is a length of each area in the second direction.

Hereinafter, an embodiment will be described.

The configuration of a storage device 100 according to the present embodiment is described in detail with reference to FIGS. 1 to 3.

Figures 1A, 1B:
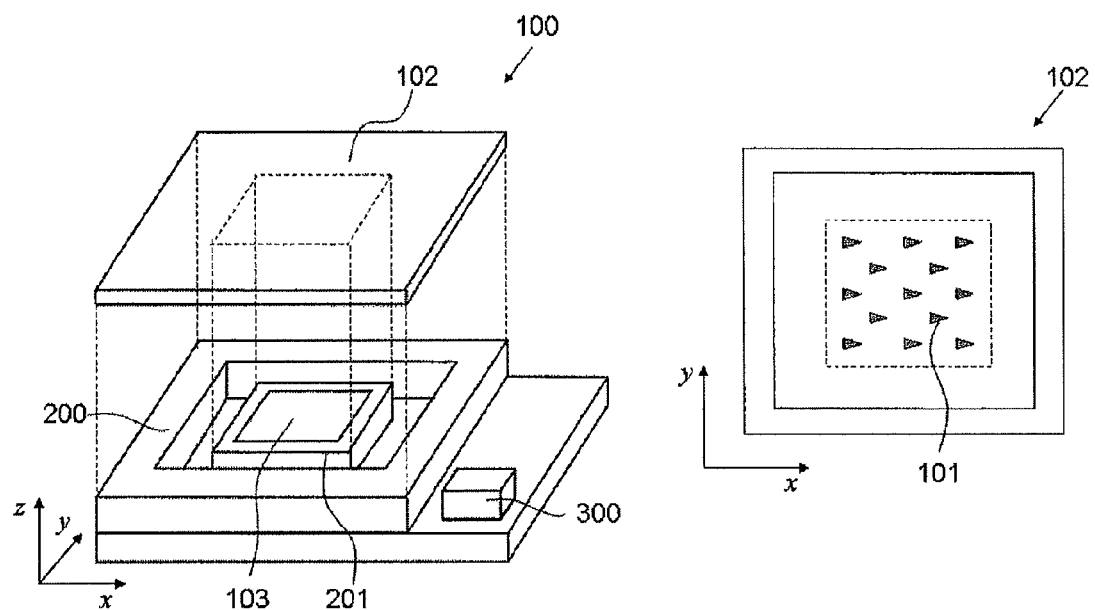
FIGS. 1A and 1B are schematic views illustrating a storage device 100 of an embodiment.

FIGS. 1A and 1B are schematic views showing the storage device 100 of the embodiment. FIG. 1A is a view illustrating the entire storage device 100. FIG. 1B is a view illustrating the rear surface of a probe unit 102 in FIG. 1A.

The storage device 100 illustrated in FIG. 1 includes a storage medium 103, a probe unit 102, an actuator 200, and a control unit 300. The storage medium 103 can hold data (signals). The probe unit 102 includes a plurality of probes 101 arranged therein. The probes 101 are each configured to write and read data to and from a storage medium 103 (hereinafter, referred to as recording/reproducing). The actuator 200 is configured to move the storage medium 103 relative to the probes 101. The control unit 300 is configured to control recording/reproducing with driving the actuator 200.

The probes 101 of the probe unit 102 are arranged to face the storage medium 103 across a first clearance. The probes 101 and the storage medium 103 are spatially separated from each other during a pause of recording/reproducing. During recording/reproducing, the actuator 200 moves the storage medium 103 so that the probes 101 are in contact with the storage medium 103.

In the contact mode, recording/reproducing of data is performed between the probes 101 and the storage medium 103, for example, with a predetermined voltage applied to the electrodes of the probes 101.

The storage medium 103 is a thin film which can hold, for example, an electrical change therein as data. Herein, a ferroelectric thin film is used as the storage medium 103.

In the present embodiment, the actuator 200 employed is an electrostatic drive actuator capable of driving in three axes (x, y, z axes).

Figure 2:
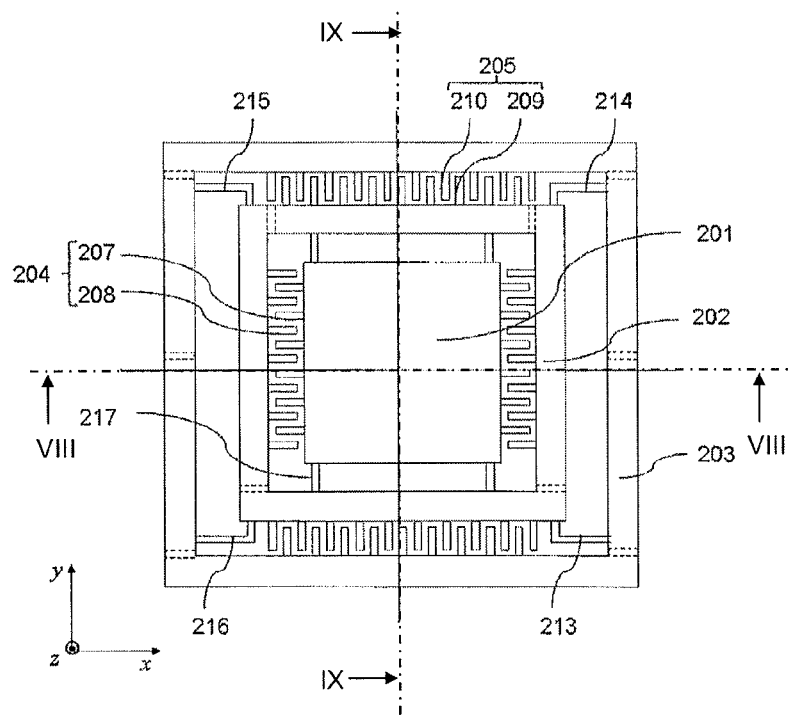
FIG. 2 is a configuration view of an actuator used for the storage device according to the embodiment.

The actuator 200 illustrated in FIG. 2 includes a rectangular flat stage (movable-portion) 201, a movable frame 202, and a fixed frame 203. The rectangular flat stage (movable-portion) 201 is configured to place the storage medium 103. The movable frame 202 is provided in the periphery of the stage 201 with a second clearance interposed between the stage 201 and the movable frame 202. The fixed frame 203 is provided in the periphery of the movable frame 202 with a third clearance interposed between the movable frame 202 and the fixing frame 203.

A fixed frame 203 supports a movable frame 202 with conductive support members 213, 214, 215, and 216. The movable frame 202 supports the stage 201 with a conductive support member 217.

On the assumption that the plane of the stage 201 is disposed parallel to the x-y plane illustrated in FIG. 2, the second clearance involves the first drive unit 204 so that the stage 201 is moved in the x-axis direction in FIG. 2. The third clearance involves the second drive unit 205 so that the stage 201 and the movable frame 202 are moved together in the y-axis direction. The first clearance involves the third drive unit 206 so that the stage 201 is moved in the z-axis direction.

The first drive unit 204 includes a plurality of first movable-portion electrodes 207 and a plurality of first fixed-portion electrodes 208 both being in the same rectangular shape, and are each arranged in a row (in the y-axis direction) at regular intervals. A plurality of first movable-portion electrodes 207 provided on the side of the stage 201, and a plurality of first fixed-portion electrodes 208 provided on the side of the movable frame 202 each project in the x-axis direction within the second clearance. In this case, it is preferred that the first movable-portion electrodes 207 and the first fixed-portion electrodes 208 are displaced in the y-axis direction by one-half interval of the same two adjacent electrodes so that both the electrodes 207 and 208 mesh with each other.

The first drive unit 204 moves the stage 201 in the x-axis direction by electrostatic force in the x-axis direction acting between the first movable-portion electrodes 207 and the first fixed-portion electrodes 208 both being adjacent to each other.

The second drive unit 205 includes a plurality of second movable-portion electrodes 209 and a plurality of second fixed-portion electrodes 210 both being in the same rectangular shape, and are each arranged in a row (in the x-axis direction) at the same intervals. A plurality of second movable-portion electrodes 209 provided on the side of the movable frame, and a plurality of second fixed-portion electrodes 210 provided on the side of the fixed frame 203 each project in the y-axis direction within the third clearance. In this case, it is preferred that the second movable-portion electrodes 209 and the second fixed-portion electrodes 210 are displaced in the x-axis direction by one-half interval of the same two adjacent electrodes so that both the electrodes 207 and 208 mesh with each other.

The second drive unit 205 moves the stage 201 and the movable frame 202 together in the y-axis direction by electrostatic force in the y-axis direction acting between the second movable-portion electrodes 209 and the second fixed-portion electrodes 210 both being adjacent to each other.

In the present embodiment, specifically, the stage 201, the movable frame 202, and the fixed frame 203 are formed so that the first movable-portion electrodes 207 and the first fixed-portion electrodes 208 are electrically insulated from each other, and the second movable-portion electrodes 209 and the second fixed-portion electrodes 210 are electrically insulated from each other.

Figure 3:
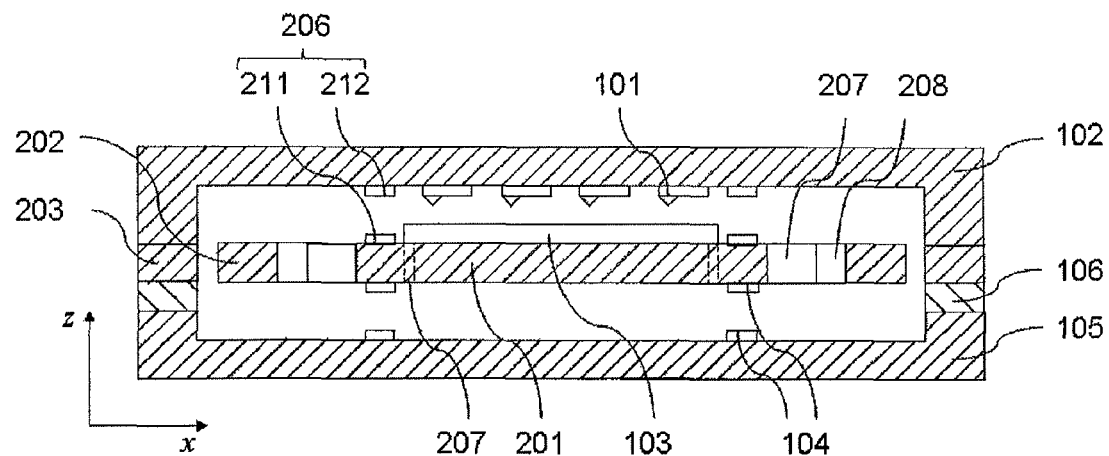
FIG. 3 is a cross-sectional view (along A-A in FIG. 2) of the storage device according to the embodiment.

In the third drive unit 206, first plate electrodes 211 provided in the periphery on the stage 201 and second plate electrodes 212 provided in the probe unit 102 that faces the stage 201 across the first clearance are arranged to face each other with a shared central axis (FIG. 3).

The third drive unit 206 moves the stage 201 in the z-axis direction by electrostatic force in the z-axis direction acting between the first plate electrodes 211 and the second plate electrode 212 so that the probes 101 and the storage medium 103 is in contact with each other.

A cap 105 is bonded to the actuator 200 via a bonding portion 106 to package the storage medium 103. Preferably, the bonding portion 106 includes an insulating material, thereby insulating the cap 105 electrically from the actuator 200.

Flat-plate electrodes are arranged at four corners on a surface "A" opposite to the side of the stage 201 holding the storage medium 103 and on a surface "B" of the cap 105. The surface "A" and the surface "B" are arranged to face each other so that the flat-plate electrodes on the surface "A" and the surface "B" also face each other. As a result, such "parallel plate type" electrodes facing each other serve as position sensors. The facing area or distance between the "parallel plate type" electrodes changes to provide changes in electrostatic capacity therebetween. The changes enable it to measure displacements in the x, y, and z-axes directions. As a result, the flat-plate electrodes configure a position sensor 104. The position sensor 104 measures displacements of the stage 201 in the x-axis, y-axis, z-axis directions based on a change in an electrostatic capacitance caused by a change in the facing area between the flat-plate electrodes, or in the distance therebetween.

As described above, the control unit 300 controls the drive of the first drive unit 204, the second drive unit 205, and the third drive unit 206 of the actuator 200. The control unit 300 applies a voltage to the storage medium 103 via the probes 101 to record and reproduce data. The control unit 300 is enabled by a processing unit such as an MPU, for example.

It should be noted that the first drive unit 204, the second drive unit 205, and the third drive unit 206 are not limited to an electrostatic drive actuator. Alternatively, a magnetic drive actuator or a piezoelectric drive actuator may be used.

Alternatively, a single probe 101 or a plurality of probes 101 may be moved in the z-axis direction to be in contact with the storage medium 103 or to be out of contact with the storage medium 103, instead of moving the stage 201 in the z-axis direction by the third drive unit 206.

(Probe Arrangement)

Hereinafter, the configurations of the probe 101 and the probe unit 102 are described in detail with reference to FIGS. 4 to 7.

Figure 4A:
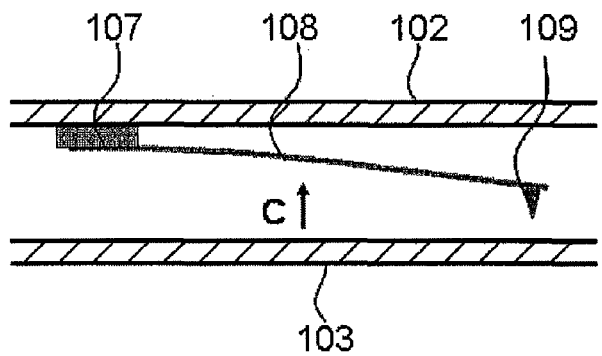
FIGS. 4A and 4B are configuration views showing a probe used for the storage device according to the embodiment.
Figure 4B:
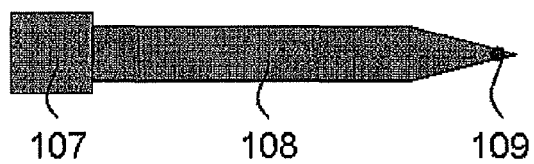

FIG. 4 is a view illustrating the configuration of the probe 101. FIG. 4A illustrates a side view of the probe 101. FIG. 4B illustrates the probe 101 when viewed in an arrow C direction in FIG. 4A.

The probe 101 is a cantilever fixing one end of a beam portion 108 of the probe 101 to the probe unit 102 via an anchor portion 107. The other end of the beam portion 108 has a recording/reproducing portion (a kind of electrode) 109. The recording/reproducing portion 109 contacts the storage medium 103 to apply a voltage thereto for recording/reproducing.

Preferably, the beam portion 108 has a shape with a large aspect ratio as illustrated in FIG. 4B. The large aspect provides the beam portion 108 with elasticity to allow the recording/reproducing portion 109 of the prove 101 to be in contact with the storage medium 103 elastically. The elasticity of the beam portion 108 enhances a robust performance for a reduction in the contact load of the recording/reproducing portion 109 or variations in the height of the storage medium 103.

Figure 5A:
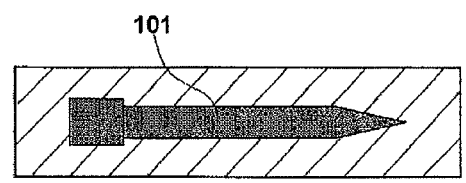
FIGS. 5A and 5B are views illustrating examples of the probe and its recording/reproduction area.

The storage device 100 with the probes 101 each having a beam portion 108 of a large aspect ratio is required to avoid causing a dead space which no probe 101 can access when the probes 101 are arranged in a matrix in the same way as in the background art. For this reason, each probe 101 needs to be confined inside an area that the probe 101 covers for recording/reproducing (hereinafter, recording/reproducing area). Therefore, as illustrated in FIG. 5A, the recording/reproducing area needs to be an area with a large aspect ratio, which is similar to the shape of the probe 101.

Here, the size of the recording/reproducing area is determined by an upper limit of the driving amount of the probe unit 102 relative to the storage medium 103. The relative driving amount depends on the first drive unit 204 and the second drive unit 205. That is, the driving amount in the x-axis direction due to the first drive unit 204 corresponds to the length of the recording/reproducing area in the x-axis direction. The driving amount in the y-axis direction due to the second drive unit 205 corresponds to the length of the recording/reproducing area in the y-axis direction.

Consequently, providing the recording/reproducing area with a larger aspect ratio as described above causes a large difference between the driving amount of the first drive unit 204 in the x-axis direction and the driving amount of the second drive unit 205 in the y-axis direction.

In the described above embodiment, an electrostatic drive actuator is used for the first drive unit 204 and the second drive unit 205. As a result, providing a large difference between the driving amounts in the x-axis and y-axis directions also requires an extreme difference between the lengths of the comb electrodes of the first drive unit 204 and the second drive unit 205. The comb electrode of the first drive unit 204 is denoted as the first movable-portion electrode 207 and the first fixed-portion electrode 208. The comb electrode of the second drive unit 205 is denoted as the second movable-portion electrode 209 and the second fixed-portion electrode 210.

Figure 5B:
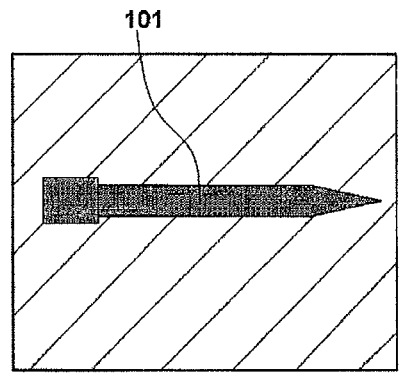

Consequently, it is preferred that the recording/reproducing area has a shape with an aspect ratio close to 1 (i.e., square) in order to avoid such an extreme difference between the drive amounts of the first drive unit 204 and the second drive unit 205. Thus, the recording/reproducing area is likely to have an aspect ratio close to 1 and have a square whose side is mostly equal to a longitudinal size of the probe 101 as illustrated in FIG. 5B in order for the probe 101 to be confined to the recording/reproducing area.

In that case, however, a recording/reproducing area which is covered by each single probe 101 is increased, thereby requiring a reduction in the number of the probes 101 included in the probe unit 102. As a result, rapid recording/reproducing is not enabled even by simultaneous recording/reproducing using a plurality of probes.

The present embodiment defines a relationship between the arrangement of the probes 101 and the size of recording/reproducing area in order to eliminate a dead space and heighten the density of the probes 101 arranged on the probe unit 102. The dead space is an area on the storage medium 103 where no probe 101 can record or reproduce.

Figure 6A:
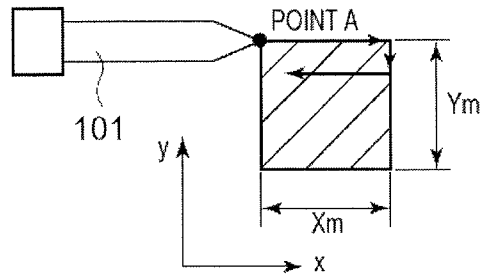
FIGS. 6A to 6C are views illustrating the arrangement of probes used for the storage device according to the embodiment (n=2).

FIG. 6A is a view illustrating a recording/reproducing area covered by a probe 101 for recording/reproducing data.

The recording/reproducing area has a rectangular shape measuring $X_m$ long in the x-axis direction (driving direction of the first drive unit) by $Y_m$ wide in the y-axis direction (driving direction of the second drive unit). The recording/reproducing area is not limited to a rectangular shape. Alternatively, the recording/reproducing area may have a rhombic shape or a hexagonal shape. In a word, the recording/reproducing area can have any shape if two or more units of the shape can cover a plane of the storage medium geometrically without interspace (corresponding to the dead space).

Each single probe 101 is in contact with the storage medium 103 and moves along the arrow of FIG. 6A in the recording/reproducing area to record and reproduce. When recording/reproducing is started (or when recording/reproducing is not in operation), the recording/reproducing portion 109 of the probe 101 is located at the point A. The point A is the corner at the upper left of FIG. 6A which is one of the four corners of the recording/reproducing area.

Figure 6B:
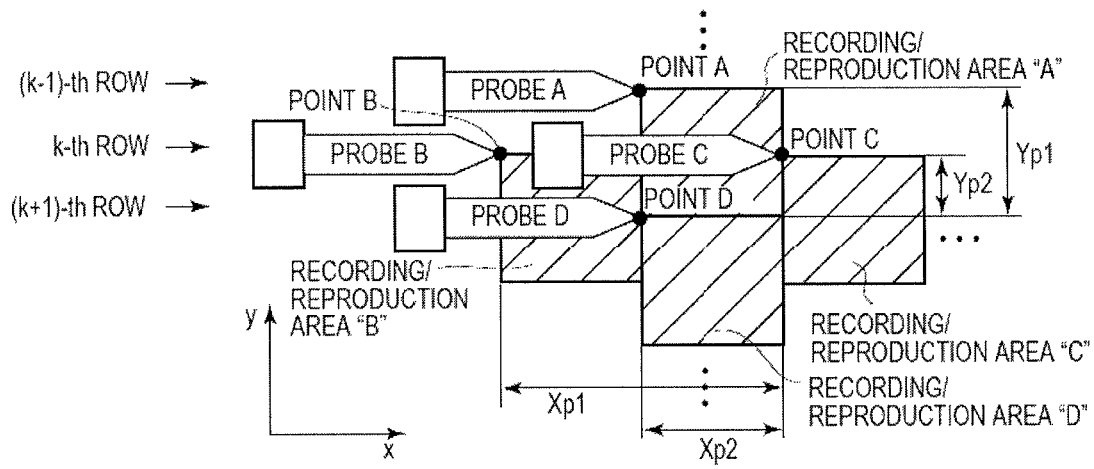
Figure 6C:
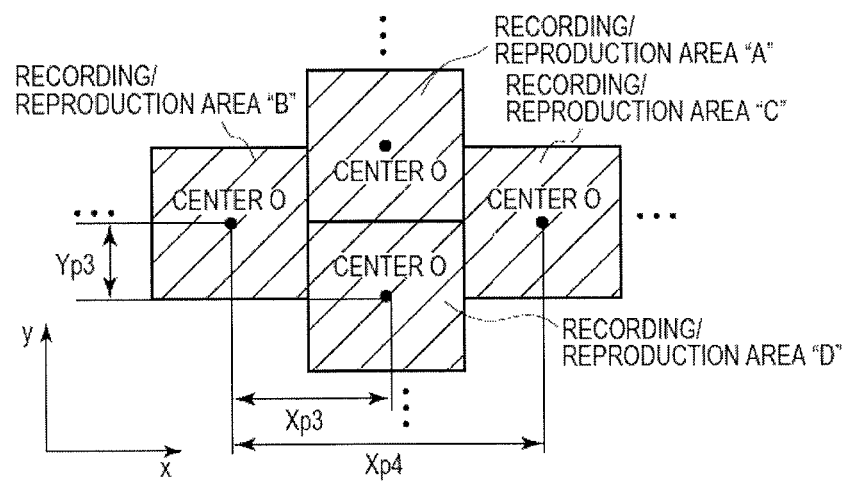

FIG. 6B is a view illustrating arrangement relationships among four adjacent probes 101 (the probes A to D). FIG. 6C is a view illustrating the arrangement relationships among the recording/reproducing areas of the respective probes 101 in FIG. 6B.

On starting recording/reproducing, the recording/reproducing portion 109 of the probe A (a third probe) is located at the corner (point A) at the upper left of a recording/reproducing area A; the recording/reproducing portion 109 of the probe B (a first probe) is located at the corner (point B) at the upper left of a recording/reproducing area B; the recording/reproducing portion 109 of the probe C (a second probe) is located at the corner (point C) at the upper left of a recording/reproducing area C; and the recording/reproducing portion 109 of the probe D (a third probe) is located at the corner (point D) at the upper left of a recording/reproducing area D.

Hereinafter, as illustrated in FIG. 6B, the probe A is assumed to be in (k−1)-th row, probes B and C are assumed to be in k-th row, and the probe D is assumed to be in (k+1)-th row.

In FIG. 6B, $X_{p1}$, $X_{p2}$, and $Y_{p2}$ denote the following. $X_{p1}$ denotes a distance in the x-axis direction between the two recording/reproducing portions 109 of the probe B and the probe C both being disposed in the k-th row and being separated from each other. $X_{p2}$ denotes a distance in the x-axis direction between the two recording/reproducing portions 109 of the probe B and the probe D both being disposed in the k-th row and the (k+1) row. $Y_{p2}$ denotes a distance in the y-axis direction between the two recording/reproducing portions 109 of the probe B and the probe D disposed in the k-th row and the (k+1) row, respectively.

The present embodiment arranges the probes 101 so that the above-described $X_{p1}$, $X_{p2}$, and $Y_{p2}$, and the sizes $X_m$ and $Y_m$ of the recording/reproducing areas satisfy the following formulae:

$$X_{p1}=n*X_m \quad \text{(Formula 1)}$$

$$X_{p2}=X_m \quad \text{(Formula 2)}$$

$$Y_p=Y_m/n \quad \text{(Formula 3)}$$

Here, n denotes an integer of 2 or more (n=2, 3, 4, . . . ). In FIG. 6C, $X_{p3}$, $Y_{p3}$, and $X_{p4}$ denote the following. $X_{p3}$ denotes the distance in the x-axis direction between the centers of the recording/reproducing areas B and D. $Y_{p3}$ denotes the distance in the y-axis direction between the centers of the recording/reproducing areas B and D. $X_{p4}$ denotes the distance in the x-axis direction between the centers of the recording/reproducing areas B and C. $X_{p3}$, $Y_{p3}$, and $X_{p4}$ satisfy the following formulae when the arrangement of the above-described probes 101 is taken into consideration.

$$X_{p3}=X_{p2} \quad \text{(Formula 4)}$$

$$Y_{p3}=Y_{p2} \quad \text{(Formula 5)}$$

$$X_{p4}=X_{p1} \quad \text{(Formula 6).}$$

The probes 101 are arranged so that the probes 101 satisfy the above Formulae 1 to 3, thereby enabling it to densely arrange probes 101 onto the probe unit 102 and to perform rapid recording/reproducing of data.

Figure 7A:
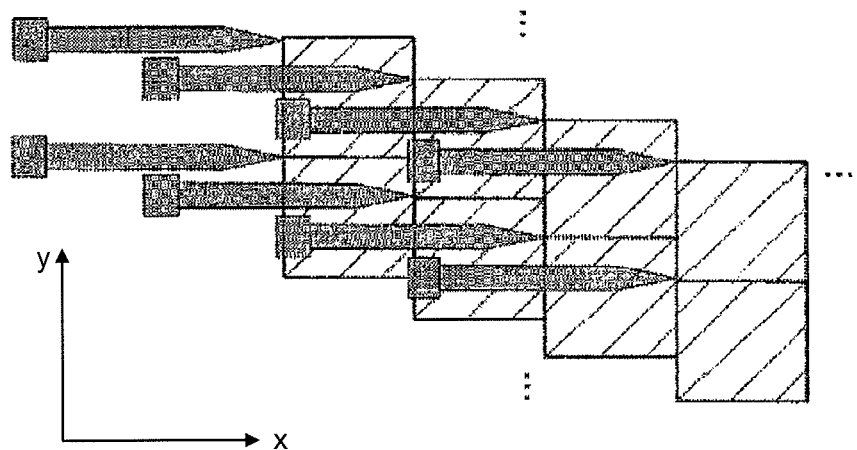
FIGS. 7A and 7B are views illustrating examples of multiple probes and their recording/reproducing areas.
Figure 7B:
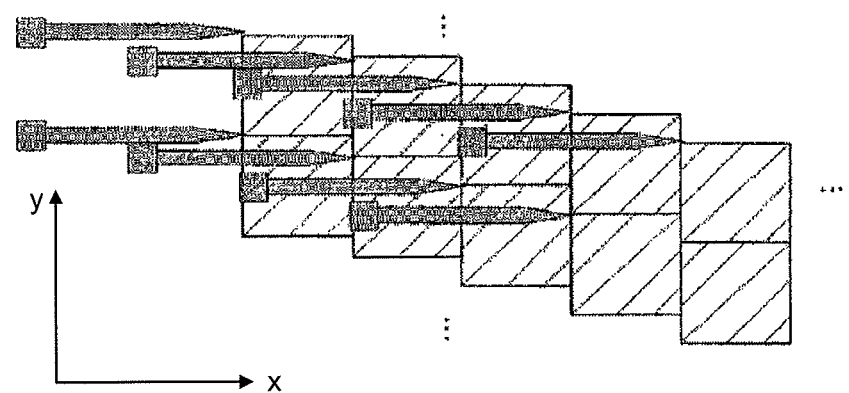

In addition, a dead space where no probe 101 can record or reproduce is eliminated, thereby enabling it to perform high-density recording. FIGS. 6A to 6C illustrate an example of n=2. FIGS. 7A and 7B illustrate examples of n=3 and n=4, respectively.

Practically, the distances between the recording/reproducing portions 109 of the probes 101 is likely to vary to some extent as a result of lot-to-lot variations in the probes 101 actually manufactured or an environmental change to the probes 101. Therefore, to be exact, the distances ($X_{p1}$, $X_{p2}$, $Y_{p2}$) specified by the above formulae 1 to 6 are different for each probe 101.

Figure 10:
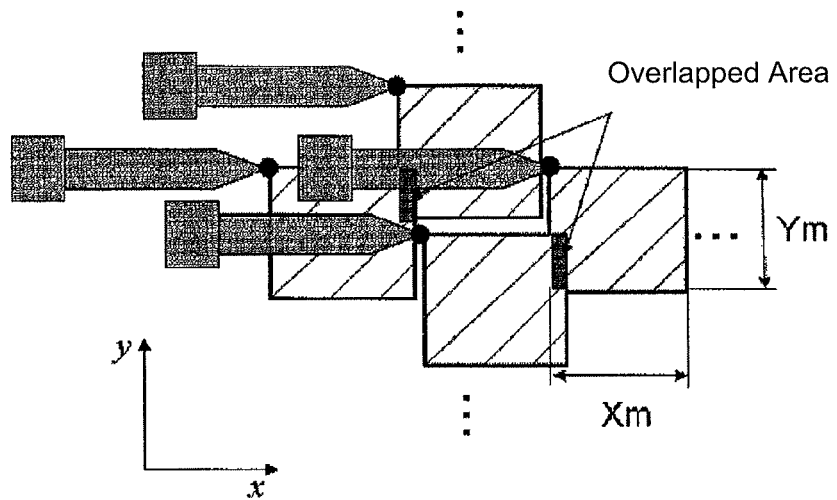
FIG. 10 is a view illustrating an overlapped area in a recording/reproducing area.
Figure 11:
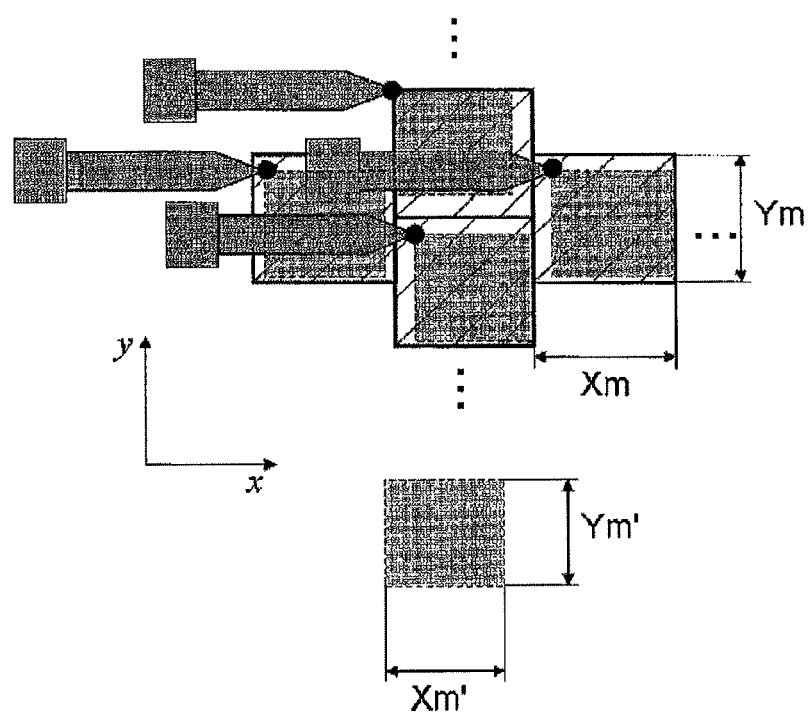
FIG. 11 is a view illustrating a margin in a recording/reproducing area.

When variations occur in the arrangement of the probes 101, the respective recording/reproducing areas are overlapped by a displacement of each recording/reproducing portion 109. FIG. 10 is a view illustrating an overlapped area due to the displacement. The overlapped area causes information to be erroneously overwritten on a portion overlapped between adjacent recording/reproducing areas. In order to avoid such erroneous overwrite, a new size of recording/reproducing area ($X_m'$, $Y_m'$) may be determined with a margin for the variation as shown in FIG. 11, thereby performing recording/reproduction with the margin. The new size is smaller than the ideal size ($X_m$, $Y_m$) of the recording/reproducing area determined without variations.

For example, when the size of the recording/reproducing area ($X_m'$, $Y_m'$) is determined based on 6% margin for the size of the ideal recording/reproducing area ($X_m$, $Y_m$), ($X_m'$, $Y_m'$) and ($X_m$, $Y_m$) can be expressed by the following formulae.

$$X_m' = X_m*(1-0.06) = 0.94x. \quad \text{(Formula 7)}$$

$$Y_m' = -Y_m*(1-0.06) = 0.94Y. \quad \text{(Formula 8)}$$

When a margin for the recording/reproducing area is taken into consideration as expressed by the above formulae, the formulae 1 to 6 allows an error of ±6% with respect to the distance between the recording/reproducing portions 109 of the probes 101.

It should be noted that (Formula 1) and (Formula 3) can be defined using only the distance between the recording/reproducing portions 109 of the probes 101, as follows. Here, $X_{p1}$ is the distance in the x-axis direction between the recording/reproducing portions 109 of the probes B and C illustrated in FIG. 6.

$$X_{p1} = n*X_{p2} \quad \text{(Formula 9)}$$

$$Y_{p2} = Y_{p1}/n \quad \text{(Formula 10)}$$

(Operation of Control Unit)

Figure 8:
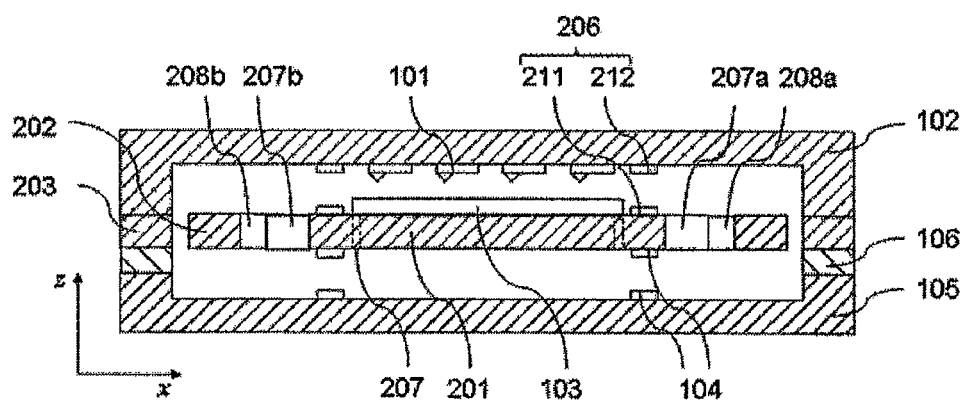
FIG. 8 is a sectional view taken along VIII-VIII in FIG. 2.

Hereinafter, the operation of the control unit 300 is described with reference to FIG. 8.

(Drive in Z-Axis Direction)

The control unit 300 applies a voltage V1 to the first plate electrode 211, and applies a voltage V2 to the second plate electrode 212 (where V1≠V2).

At this event, electrostatic force (attracting force) due to a potential difference (V1−V2) is generated between the first plate electrode 211 and the second plate electrode 212. The electrostatic force attracts the first plate electrode 211 toward the second plate electrode 212 (in the positive z-axis direction) to move the stage 201 in the positive z-axis direction.

(X- and Y-Axis Drive)

The control unit 300 drives the stage 201 in the z-axis direction as described above and drives the probe 101 in the x-axis and y-axis directions to position the probe 101 within the plane of the storage medium 103.

Figure 9:
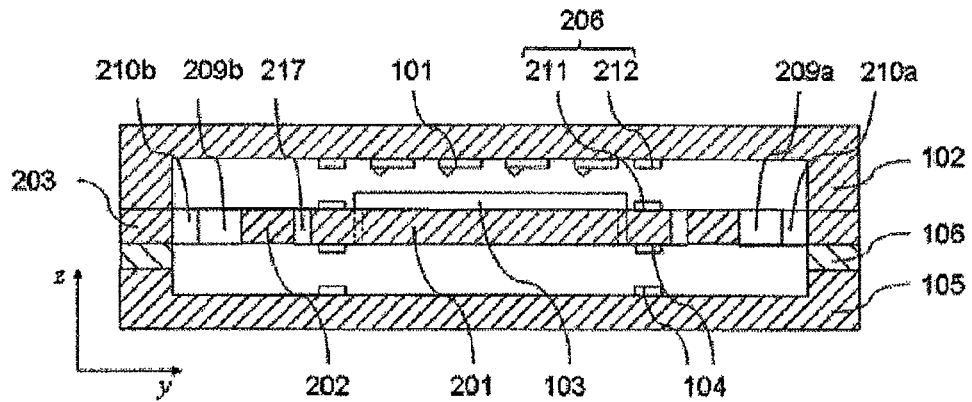
FIG. 9 is a sectional view taken along IX-IX in FIG. 2.

FIG. 9 is a sectional view taken along IX-IX in FIG. 2.

The control unit 300 applies a voltage V1 to first movable-portion electrodes 207a and 207b, e.g., via an electrode pad (not shown) or the like. Simultaneously, the control unit 300 applies a voltage V2 to a first fixed-portion electrode 208a, and applies a voltage V3 to a first fixed-portion electrode 208b (where V2>V1, V3>V1).

V2>V3 yields |V2−V1|>|V3−V1|, thereby making first electrostatic force larger than second electrostatic force. Here, the first electrostatic force is generated in the x-axis direction between the first movable-portion electrode 207a and the first fixed-portion electrode 208a. The second electrostatic force is generated in the x-axis direction between the first movable-portion electrode 207b and the first fixed-portion electrode 208b. As a result, the stage 201 moves in the positive x-axis direction.

In contrast, V3>V2 yields |V3−V1|>|V2−V1|, thereby making the second electrostatic force larger than the first electrostatic force. Here, the first electrostatic force is generated in the x-axis direction between the first movable-portion electrode 207a and the first fixed-portion electrode 208a. The second electrostatic force is generated in the x-axis direction between the first movable-portion electrode 207b and the first fixed-portion electrode 208b. As a result, the stage 201 moves in the negative x-axis direction.

FIG. 9 is a cross-sectional view taken along IX-IX in FIG. 2.

The control unit 300 applies a voltage V4 to a second movable-portion electrode 209a and applies a voltage V5 a second movable-portion electrode 209b, e.g., via an electrode pad (not shown) or the like. Simultaneously, the control unit 300 applies a voltage V6 to a second fixed-portion electrode 210a, and applies a Voltage V7 to a second fixed-portion electrode 210b (where V6>V4, V7>V5).

|V6−V4|>|V7−V5| makes the electrostatic force between the second movable-portion electrode 209a and the second fixed-portion electrode 210a larger than the electrostatic force between the second movable-portion electrode 209b and the second fixed-portion electrode 210b. As a result, the stage 201 moves in the positive y-axis direction.

In contrast, |V7−V5|>|V6−V4| makes the electrostatic force generated between the second movable-portion electrode 209b and the second fixed-portion electrode 210b larger than the electrostatic force generated between the second movable-portion electrode 209a and the second fixed-portion electrode 210a. As a result, the stage 201 moves in the negative y-axis direction.

The upper limits of the driving amounts in the x-axis direction and the y-axis direction (i.e., the size of the recording/reproducing area) may be previously determined in accordance with the arrangement of the probes 101 unless comb electrodes of the respective drive units are in contact with the facing side surfaces.

The control unit 300 calculates a specific value of voltage by inputting a displacement of the stage 201 measured by the position sensor 104 so that a difference of the inputted displacement from a target value of displacement converges to 0.

(Record and Reproduction)

When the probes 101 and the storage medium 103 are in contact with each other, the stage 201 and the electrodes of the probes 101 forms a partially ferroelectric capacitor via the storage medium 103 of a ferroelectric material. As described above, relative positioning of the probe 101 with respect to the storage medium 103 is performed as well as recording/reproducing of data.

Specifically, when data is to be recorded, the control unit 300 applies a voltage to the storage medium 103 via the recording/reproducing portion 109 of the probe 101 to cause polarization of electric charge in the storage medium 103, thereby recording data. On the other hand, when data is to be reproduced, the control unit 300 applies a pulse voltage to the storage medium 103 via the recording/reproducing portion 109 of the probe 101 to detect a current generated by polarization inversion of electric charge, thereby reproducing data.

In both cases, the probes 101 apply a voltage individually or simultaneously to the storage medium 103 to enable recording/reproducing of data.

Alternatively, an insulated thin film including a metal oxide may be used as the storage medium 103, thereby enabling it to perform recording/reproducing by retrieving data of changes in the resistance of the storage medium 103 caused by a voltage that the probe 101 applies.

As described above, the storage device in accordance with the embodiment enables high-density recording of data.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
a storage medium including a plurality of areas and configured to store a signal in each of the areas; and
a plurality of probes, each of which has a recording/reproducing portion facing the storage medium and is configured to record/reproduce a signal to/from each of the areas via the portion,
wherein:
the probes include a first probe, a second probe spaced from the first probe in a first direction, and a third probe spaced from the first probe in the first direction and in a second direction different from the first direction; and
a distance $X_{p1}$ in the first direction between the portions of the first probe and the second probe, a distance $X_{p2}$ in the first direction between the portions of the first probe and the third probe, and a distance $Y_{p2}$ in the second direction between the portions of the first probe and the third probe satisfy the following formulae:

$$X_{p1} = n \cdot X_m$$

$$X_{p2} = X_m$$

$$Y_{p2} = Y_m/n \qquad \text{[Math 1]}$$

(, provided that n=2, 3, 4, . . . ),
where
$X_m$ is a length of each area in the first direction; and
$Y_m$ is a length of each area in the second direction,
the areas include a first area where the first probe records or reproduces the signal, and a second area where the third probe records or reproduces the signal; and
a distance $X_{p3}$ in the first direction between centers of the first area and the second area and a distance $Y_{p3}$ in the second direction between centers of the first area and the second area satisfy the following formulae:

$$X_{p3} = X_{p2}$$

$$Y_{p3} = Y_{p2}. \qquad \text{[Math 2]:}$$

2. The device according to claim 1, further comprising:
a first drive unit configured to drive the probe or the storage medium in the first direction; and
a second drive unit configured to drive the probe or the storage medium in the second direction.

3. The device according to claim 2, wherein
the length $X_m$ of each area in the first direction is a driving amount by which the first drive unit drives the probe or the storage medium in the first direction, and
the length $Y_m$ of each area in the second direction is a driving amount by which the second drive unit drives the probe or the storage medium in the second direction.

* * * * *